(12) United States Patent
Lee et al.

(10) Patent No.: US 10,756,932 B2
(45) Date of Patent: Aug. 25, 2020

(54) METHOD FOR TRANSMITTING/DETECTING DATA ON THE BASIS OF NON-ORTHOGONAL MULTIPLE ACCESS METHOD, AND DEVICE THEREFOR

(71) Applicant: LG ELECTRONICS INC., Seoul (KR)

(72) Inventors: Hojae Lee, Seoul (KR); Kijun Kim, Seoul (KR); Eunsun Kim, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/327,240

(22) PCT Filed: Jul. 28, 2017

(86) PCT No.: PCT/KR2017/008147
§ 371 (c)(1),
(2) Date: Feb. 21, 2019

(87) PCT Pub. No.: WO2018/038410
PCT Pub. Date: Mar. 1, 2018

(65) Prior Publication Data
US 2019/0223225 A1    Jul. 18, 2019

Related U.S. Application Data

(60) Provisional application No. 62/378,184, filed on Aug. 22, 2016.

(51) Int. Cl.
*H04L 25/03* (2006.01)
*H04L 25/02* (2006.01)
(Continued)

(52) U.S. Cl.
CPC .... *H04L 25/03866* (2013.01); *H04L 25/0224* (2013.01); *H04W 72/0466* (2013.01); *H04W 74/0833* (2013.01); *H04L 25/03* (2013.01)

(58) Field of Classification Search
CPC ......... H04L 25/0224; H04L 25/03866; H04W 74/0466; H04W 74/0833
See application file for complete search history.

(56) References Cited

U.S. PATENT DOCUMENTS

2015/0312074 A1* 10/2015 Zhu ...................... H04L 27/2627
370/329
2017/0134109 A1* 5/2017 Hwang ................ H04J 11/0033
(Continued)

FOREIGN PATENT DOCUMENTS

| WO | 2011126351 A2 | 10/2011 |
| WO | 2016072687 A1 | 5/2016 |
| WO | 2016072696 A2 | 5/2016 |

OTHER PUBLICATIONS

R1-166186: 3GPP TSG RAN WG1 Meeting #86; "Discussion on signaling design for MUST," Huawei, HiSilicon, Gothenburg, Sweden Aug. 22-26, 2016, pp. 1-4.
(Continued)

*Primary Examiner* — Gary Mui
(74) *Attorney, Agent, or Firm* — Dentons US LLP

(57) ABSTRACT

Provided is a non-orthogonal multiple access method, which: randomly selects a physical resource for performing non-orthogonal multiple access among the contention-based data transmission areas defined in advance; selects a reference signal sequence for a contention-based data transmission through the selected physical resource; selects a contention resource for the contention-based data transmission; selects a scrambling sequence to be applied to data transmission in the contention-based data transmission; and transmitting a data channel including data and a reference
(Continued)

signal corresponding to the selected reference signal sequence through the selected physical resource, wherein the data channel is transmitted by allowing the selected scrambling sequence to be applied thereto.

15 Claims, 14 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2018/0054339 A1* | 2/2018 | Sun | H04L 27/2649 |
| 2019/0013911 A1* | 1/2019 | Muruganathan | H04B 7/0456 |
| 2019/0045493 A1* | 2/2019 | Kimura | H04L 25/068 |
| 2019/0141750 A1* | 5/2019 | Lee | H04W 74/08 |
| 2019/0181993 A1* | 6/2019 | Lee | H04J 13/10 |
| 2019/0305877 A1* | 10/2019 | Lee | H04W 74/08 |
| 2020/0028611 A1* | 1/2020 | Lee | H04J 15/00 |

OTHER PUBLICATIONS

R1-167689: 3GPP TSG-RAN WG1 Meeting #86, "MUST Case 1 and 2 transmission schemes," Nokia, Alcatel-Lucent Shanghai Bell, Gothenburg, Sweden, Aug. 22-26, 2016, pp. 1-6.

* cited by examiner

FIG. 9
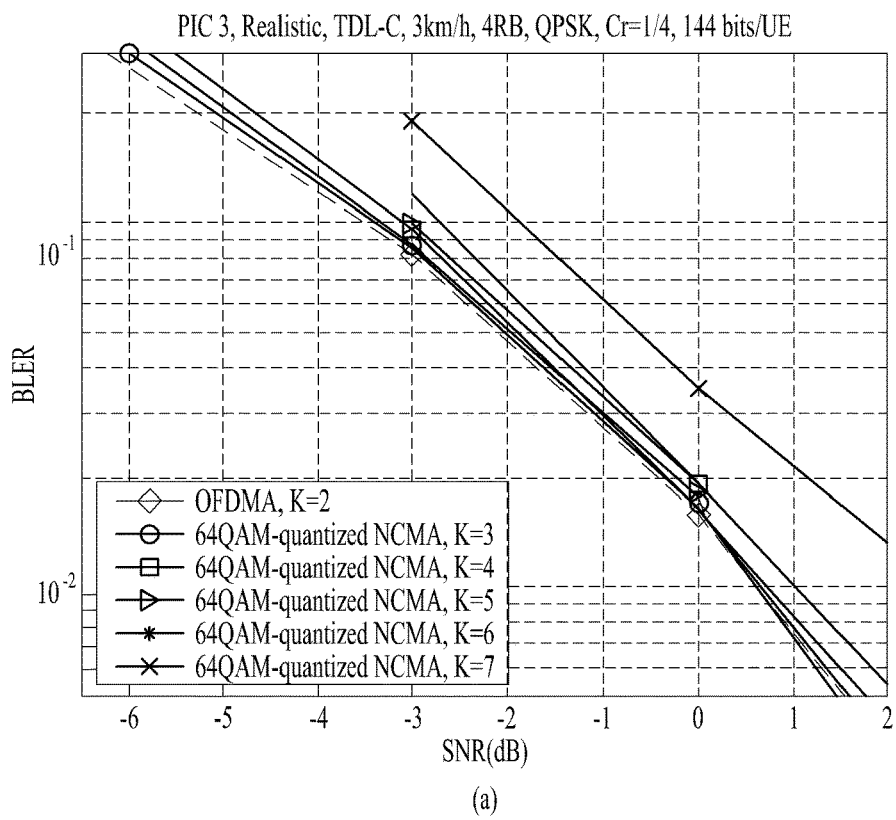
(a)
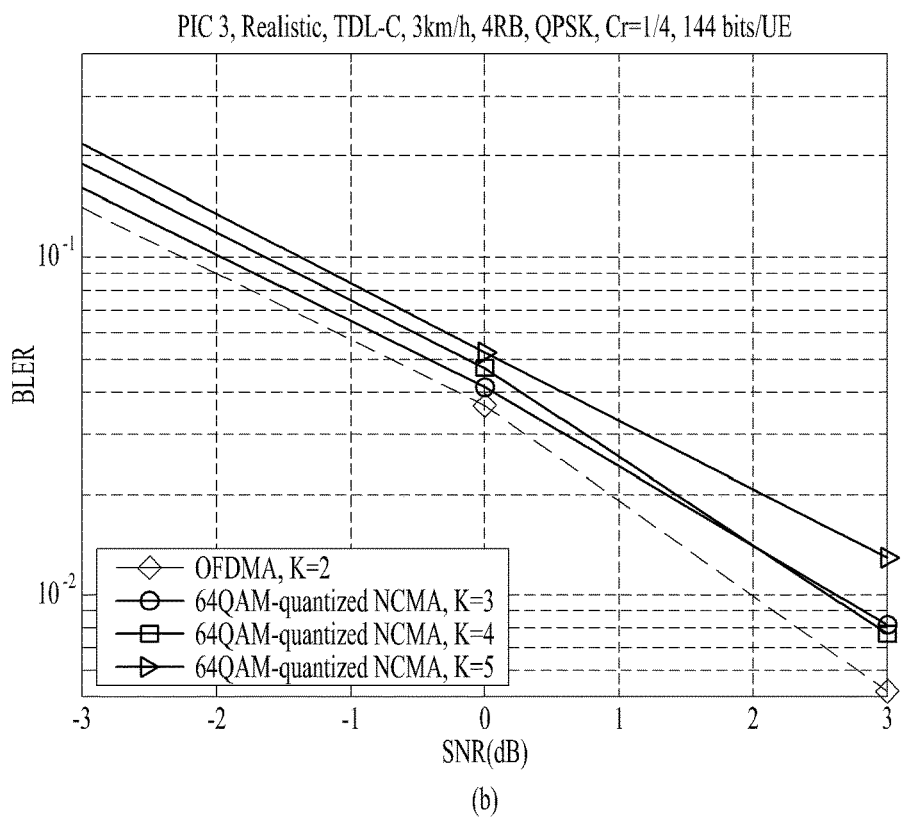
(b)

FIG. 14
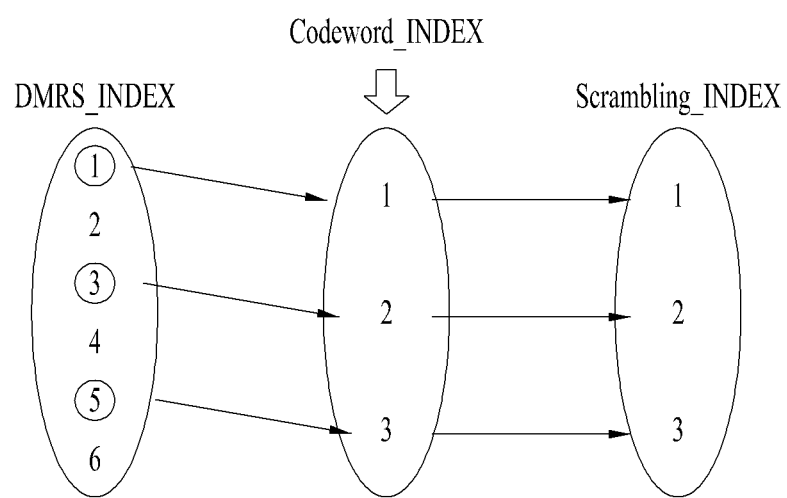
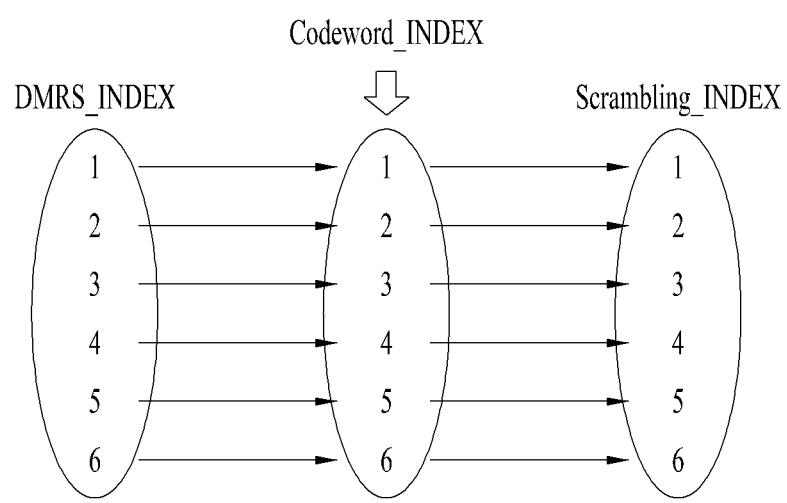

METHOD FOR TRANSMITTING/DETECTING DATA ON THE BASIS OF NON-ORTHOGONAL MULTIPLE ACCESS METHOD, AND DEVICE THEREFOR

CROSS REFERENCE TO RELATED APPLICATIONS

This application is the National Phase of PCT International Application No. PCT/KR2017/008147, filed on Jul. 28, 2017, which claims priority under 35 U.S.C. 119(e) to U.S. Provisional Application No. 62/378,184, filed on Aug. 22, 2016, all of which are hereby expressly incorporated by reference into the present application.

TECHNICAL FIELD

The present invention relates to a wireless communication, and more particularly, to a method of transmitting/detecting data based on a non-orthogonal multiple access scheme and an apparatus therefor.

BACKGROUND ART

3GPP LTE (3rd Generation Partnership Project Long Term Evolution) system has been designed in a frame structure having a transmission time interval (TTI) of 1 ms, and its data request latency time for a video application is 10 ms.

However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km2.

DISCLOSURE OF THE INVENTION

Technical Tasks

A technical task of the present invention is to provide a method for a user equipment to transmit data based on a non-orthogonal multiple access scheme.

Another technical task of the present invention is to provide a method for a base station to detect data according to a non-orthogonal multiple access scheme.

Another technical task of the present invention is to provide a user equipment transmitting data based on a non-orthogonal multiple access scheme.

The other technical task of the present invention is to provide a base station detecting data according to a non-orthogonal multiple access scheme.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for a user equipment (UE) transmitting data based on a non-orthogonal multiple access scheme, includes the steps of randomly selecting a physical resource for performing non-orthogonal multiple access from a predefined contention based data transmission resource region, selecting a reference signal sequence for performing contention based data transmission through the selected physical resource, selecting a contention resource for performing the contention based data transmission, selecting a scrambling sequence to be applied to a data transmission in the contention based data transmission, and transmitting a data channel including data and a reference signal corresponding to the selected reference signal sequence through the selected physical resource. In this case, the data channel can be transmitted by applying the selected scrambling sequence. The selected reference signal sequence can be selected based on an identifier of the UE. The selected contention resource can include a selected codeword. The selected codeword can be selected based on the selected reference signal sequence according to a predefined rule. The method can further include the step of receiving information on the predefined contention based data transmission resource region from a base station.

To further achieve these and other advantages and in accordance with the purpose of the present invention, according to a different embodiment, a method for a base station (BS) detecting data according to an orthogonal multiple access scheme, includes the steps of receiving a reference signal and data in a predefined contention based data transmission resource region, detecting the reference signal and the data from the predefined contention based data transmission resource region, detecting a codeword corresponding to the detected data and a scrambling sequence applied to the detected data from a reference signal sequence corresponding to the detected reference signal based on a predefined rule, and decoding the data based on the reference signal sequence, the codeword, and the scrambling sequence. The method can further include the step of identifying a user equipment from which the data is transmitted based on the reference signal sequence, the codeword, and the scrambling sequence according to the predefined rule. The method can further include the steps of performing channel estimation using the detected reference signal and performing channel equalization in the predefined contention based data transmission resource region based on the channel estimation.

To further achieve these and other advantages and in accordance with the purpose of the present invention, according to a further different embodiment, a user equipment (UE) transmitting data based on an orthogonal multiple access scheme includes a processor configured to randomly select a physical resource for performing non-orthogonal multiple access from a predefined contention based data transmission resource region, the processor configured to select a reference signal sequence for performing contention based data transmission through the selected physical resource, the processor configured to select a contention resource for performing the contention based data transmission, the processor configured to select a scrambling sequence to be applied to a data transmission in the contention based data transmission, and a transmitter configured to transmit a data channel including data and a reference signal corresponding to the selected reference signal sequence through the selected physical resource. In this case, the processor can apply the selected scrambling sequence to the data channel. The processor can be configured to select the reference signal sequence based on an identifier of the UE. The selected contention resource can include a selected codeword. The processor can be configured to select the codeword based on the selected reference signal sequence according to a predefined rule. The processor can be configured to select the selected scrambling sequence based on the selected codeword according to the predefined rule.

To further achieve these and other advantages and in accordance with the purpose of the present invention, according to a further different embodiment, a base station detecting data according to an orthogonal multiple access scheme includes a receiver configured to receive a reference signal and data in a predefined contention based data transmission resource region and a processor configured to detect the reference signal and the data from the predefined contention based data transmission resource region, the processor configured to detect a codeword corresponding to the detected data and a scrambling sequence applied to the detected data from a reference signal sequence corresponding to the detected reference signal based on a predefined rule, the processor configured to decode the data based on the reference signal sequence, the codeword, and the scrambling sequence.

Advantageous Effects

According to one embodiment of the present invention, when contention-based data transmission is performed in non-orthogonal multiple access, it is able to improve communication performance by considerably reducing a collision probability between user equipments.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention.

FIG. 9 is a diagram illustrating BLER performance when perfect channel estimation is performed and realistic channel estimation is performed although two or more users use a different DMRS.

FIG. 14 is a diagram illustrating a mapping relationship among a scrambling sequence, a codeword index, and a DMRS index.

BEST MODE

Mode for Invention

Figure 1:
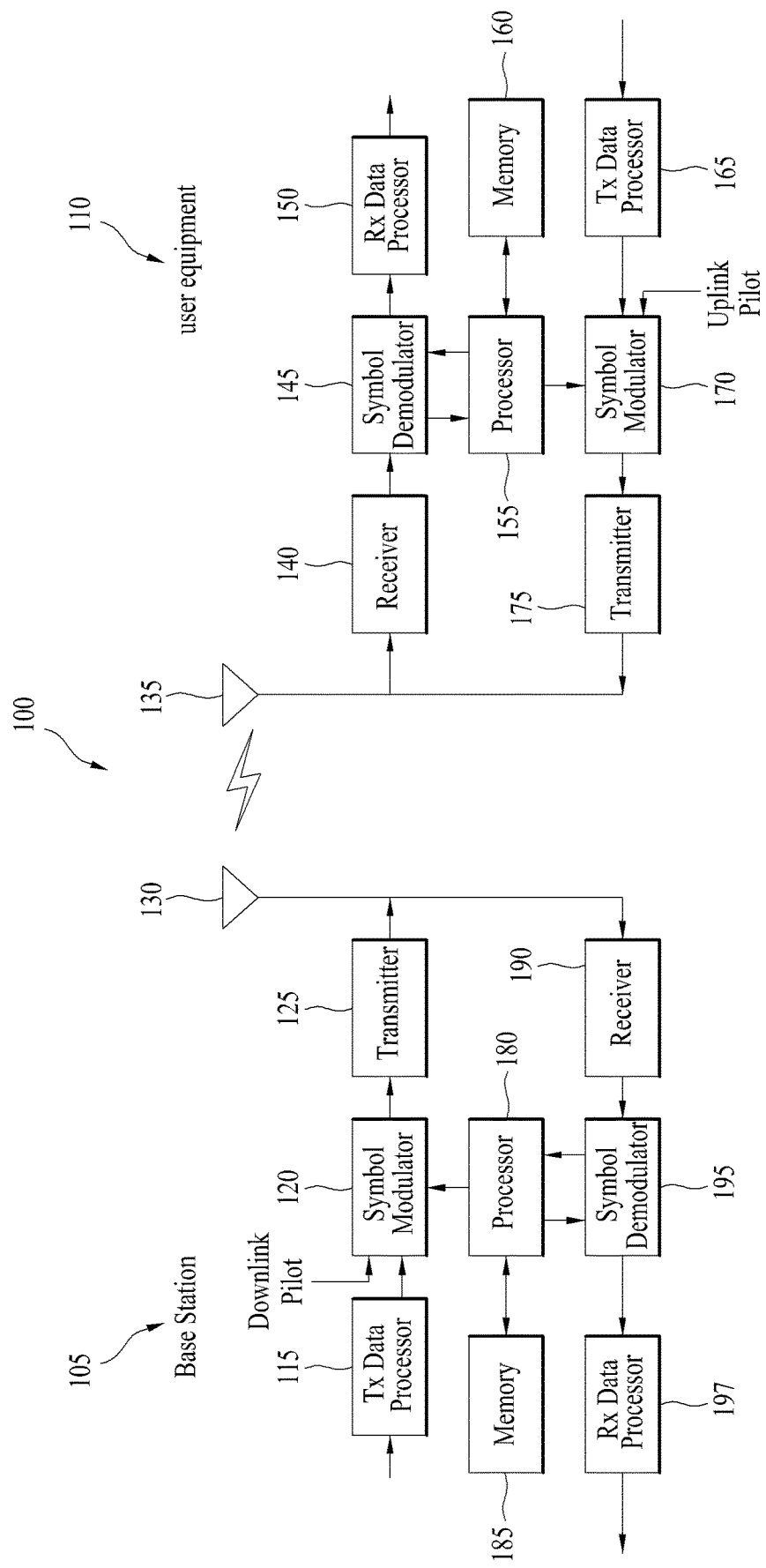
FIG. 1 is a block diagram illustrating configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

When wireless transmission is performed between a base station and a user equipment, a transmission from the base station to the user equipment and a transmission from the user equipment to the base station are referred to as a downlink transmission and an uplink transmission, respectively. A technique of distinguishing a radio resource between the downlink transmission and the uplink transmission is defined as duplex. When a frequency band is divided into a downlink transmission band and an uplink transmission band and transmission and reception are bi-directionally performed, it is represented as frequency division duplex (FDD). It is apparent that a technique proposed in the present invention operates not only in the frequency division duplex but also in time division duplex (TDD) and full duplex. In TDD, a time resource is divided into downlink transmission time and uplink transmission time and transmission and reception are bi-directionally performed. In full duplex, transmission and reception are bi-directionally performed by sharing a time resource and a frequency resource.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Figure 2:
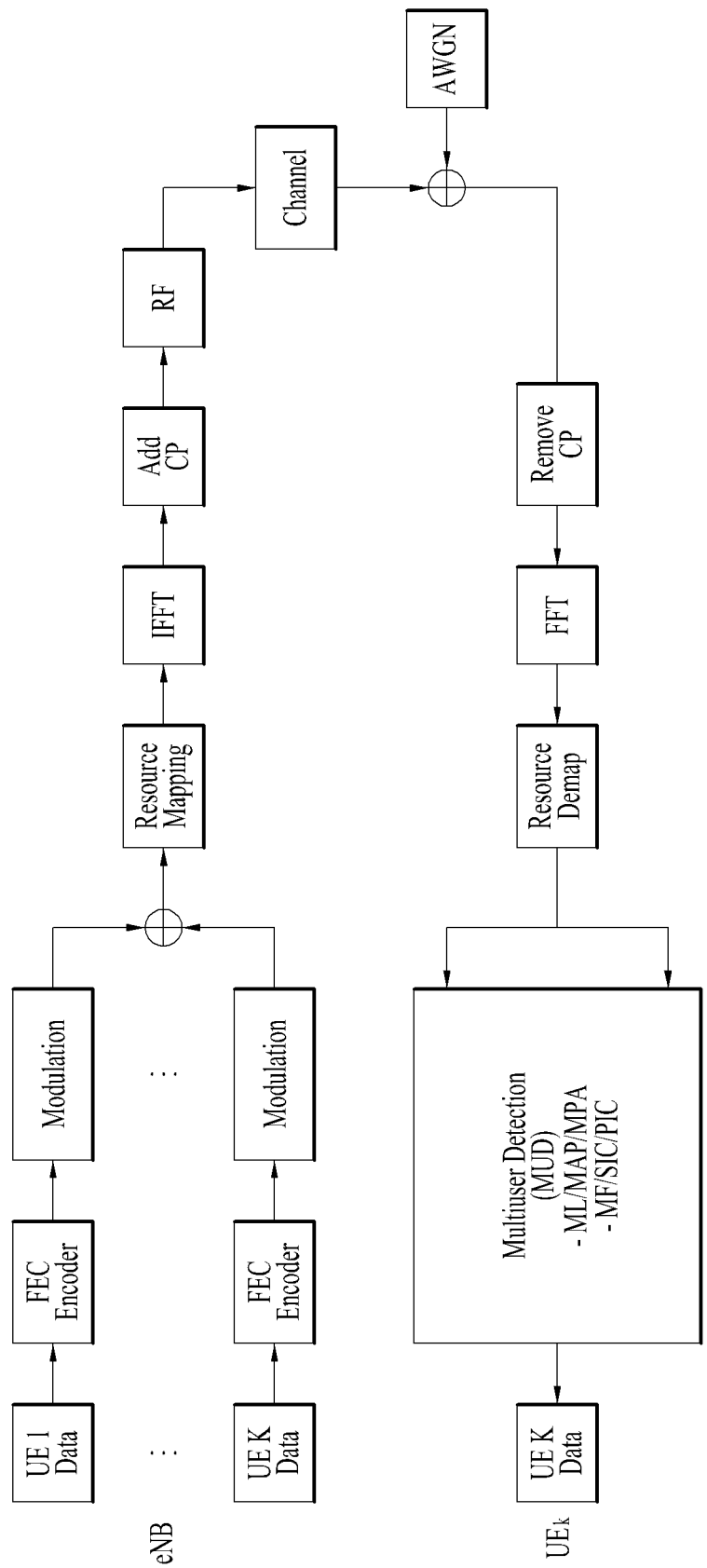
FIG. 2 is a block diagram illustrating NOMA based downlink transmission/reception (Tx/Rx) of a communication apparatus.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes a non-orthogonal codebook based multi-user superposition access transmission scheme and an orthogonal codebook based multi-user superposition access transmission scheme.

FIG. 2 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 2 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 2 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 2 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 2 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 3:
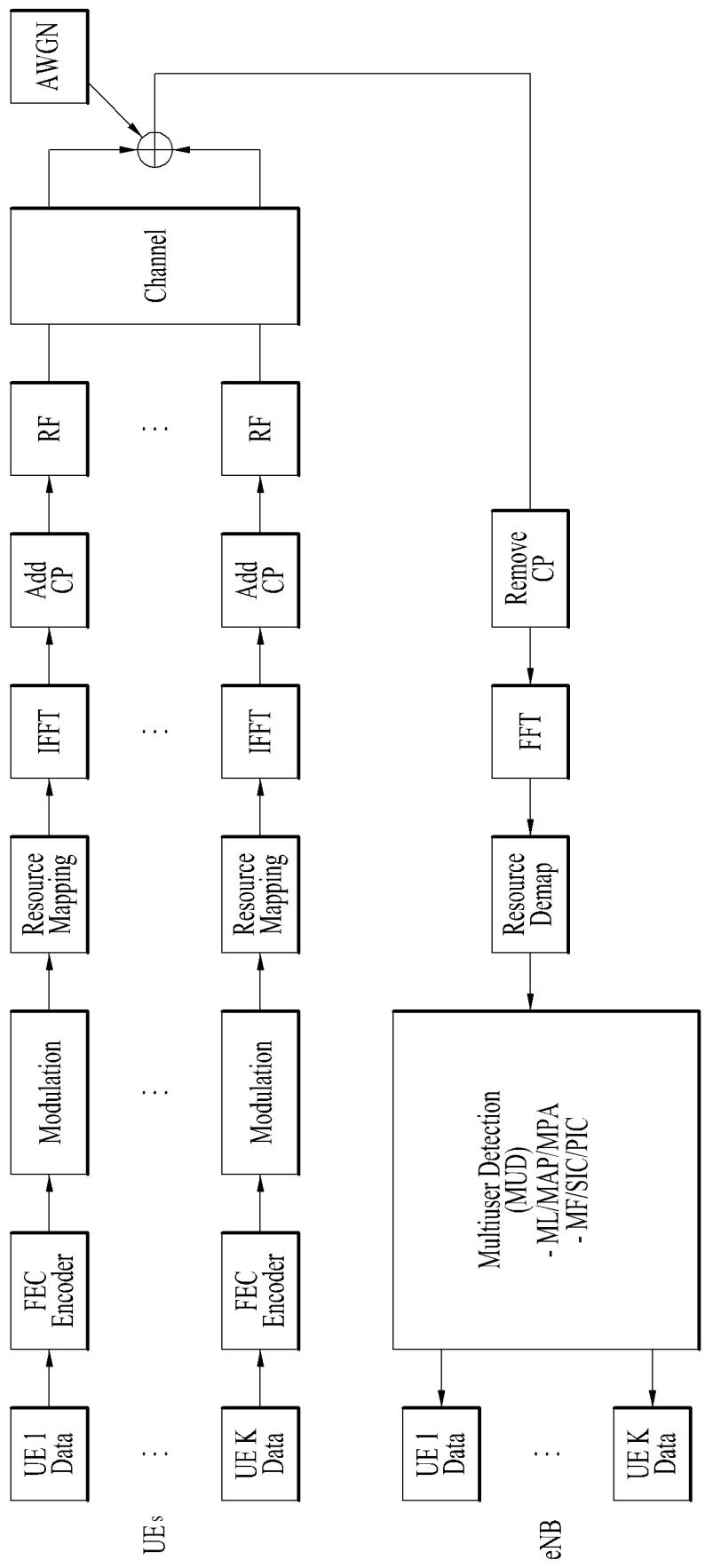
FIG. 3 is a block diagram illustrating NOMA based uplink transmission/reception (Tx/Rx) of a communication apparatus.

FIG. 3 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 3. Each system may transmit multi-UE data in the same manner as the description of the downlink structure of FIG. 2 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 2 is simply expressed as illustrated in the following Equation 1.

$$y_k = \sum_{n=1}^{K} h_k s_n + n_k = h_k s_k + \sum_{n \neq k, n=1}^{k} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \ne k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \ne k, n=1}^{K} h_k s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of $R_k$ added in accordance with increase of K may be increased, whereby increase of C may be expected. However, each $R_k$ may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 4:
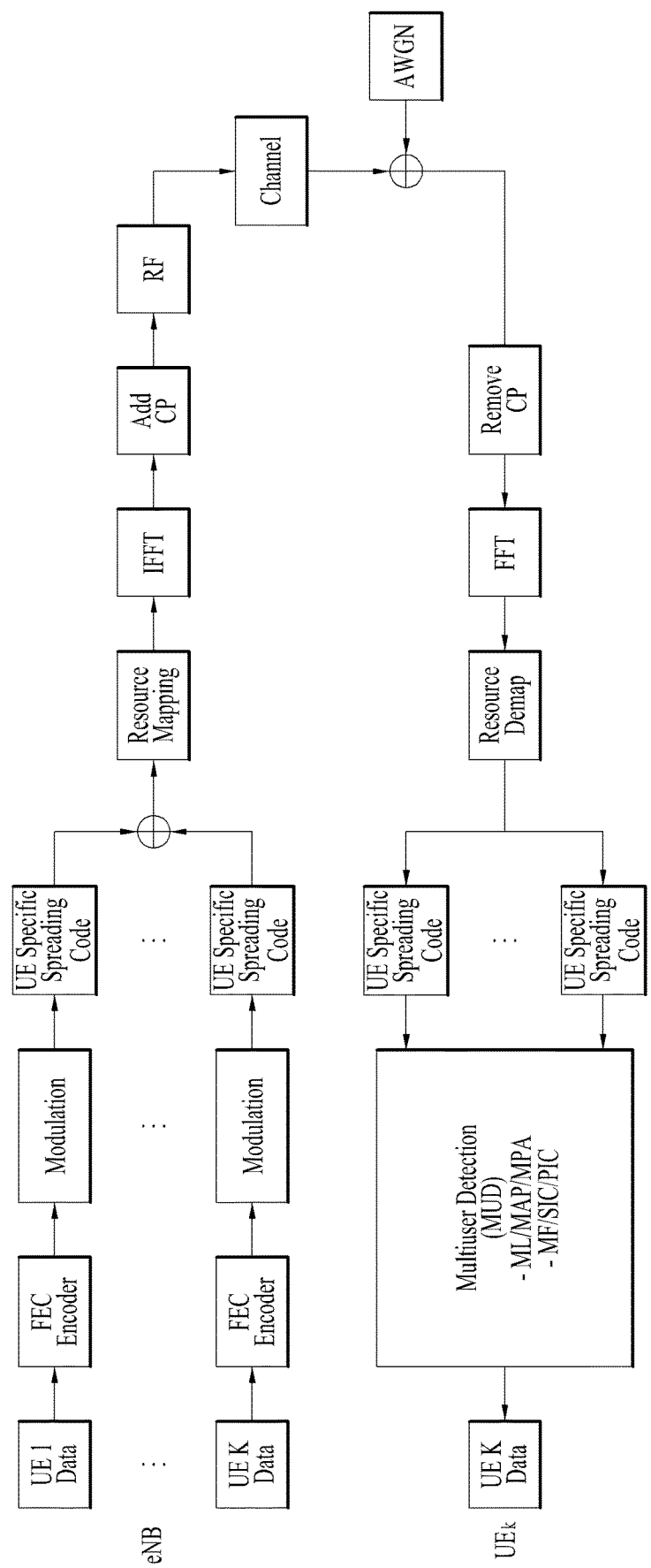
FIG. 4 is a block diagram illustrating NOMA and non-orthogonal spreading code based downlink transmission/reception (Tx/Rx) of a communication apparatus.
Figure 5:
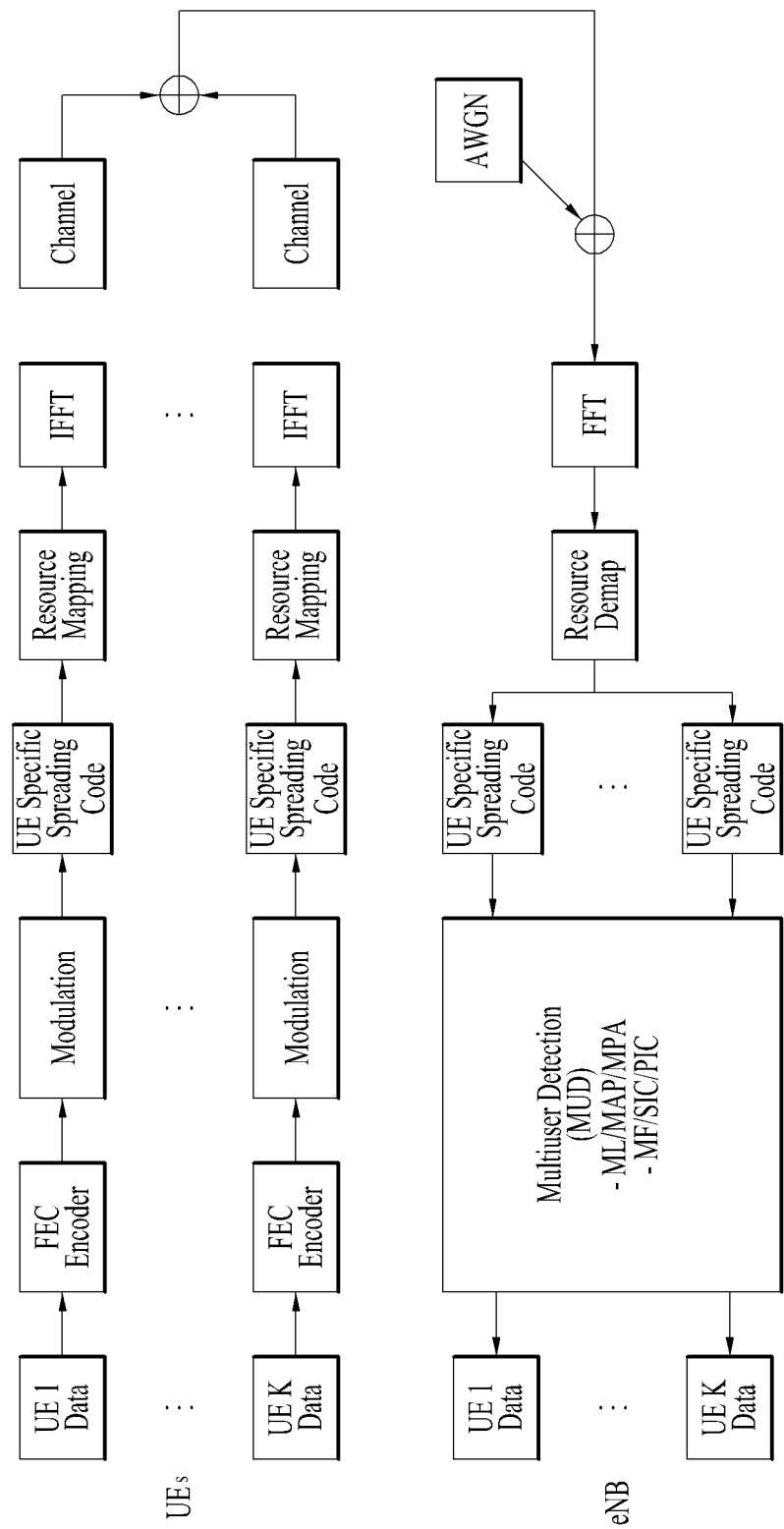
FIG. 5 is a block diagram illustrating NOMA and non-orthogonal spreading code based uplink transmission/reception (Tx/Rx) of a communication apparatus.

FIG. 4 is a block diagram illustrating NCMA based downlink transmission/reception (Tx/Rx) of a communication apparatus, and FIG. 5 is a block diagram illustrating NCMA based uplink transmission/reception (Tx/Rx) of a communication apparatus.

Among the NOMA techniques, when multi-user data are transmitted to the same time-frequency resource through superposition via a spreading scheme, an orthogonal codebook based type (e.g., SCMA, CDMA, etc.) assumes a multiple access scheme that uses a non-orthogonal spreading code. FIGS. 4 and 5 illustrate a downlink transmitting/receiving end structure and an uplink transmitting/receiving end structure of a NOMA system that transmits multiple user information through superposition using a UE-specific spreading code, when the multiple user information is assigned to the same time-frequency resource. In FIGS. 4 and 5, although the UE-spreading code is used in a time axis, the UE-spreading code can be used in a time axis as well.

A transmitting end/receiving end allocates a UE-specific spreading code to each user using a predefined codebook. The UE-specific spreading code can be expressed by an equation 3 described in the following.

$$C = [c^{(1)} \ \cdots \ c^{(K)}] = \begin{bmatrix} c_1^{(1)} & \cdots & c_1^{(K)} \\ \vdots & \ddots & \vdots \\ c_N^{(1)} & \cdots & c_N^{(K)} \end{bmatrix} \quad \text{[Equation 3]}$$

A UE-specific spreading codebook corresponds to a codebook satisfying $C \subset \mathbb{C}^{N \times K}$ and has characteristics described in equation 4 in the following.

$$\begin{cases} |c^{(k)*} \cdot c^{(k)}| = 1, \forall k, k = 1, \ldots, K, \\ |c^{(k)*} \cdot c^{(j)}| = \delta_{kj}, \forall k, \forall j, k \ne j, k = 1, \ldots, K, j = 1, \ldots, K, \end{cases} \quad \text{[Equation 4]}$$

Figure 6:
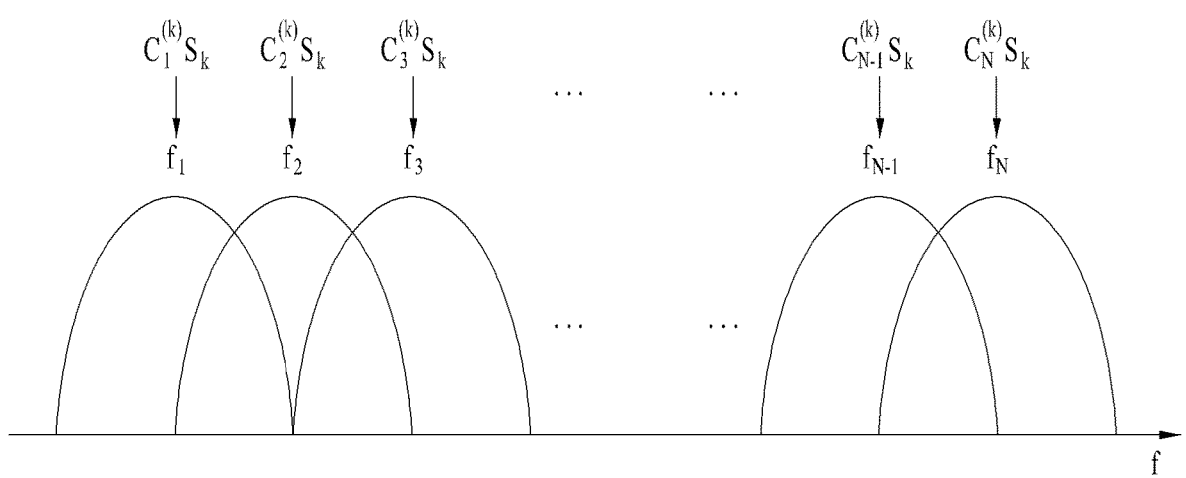
FIG. 6 is a conceptual diagram illustrating a frequency axis of a data transmission transmitted by a UE-specific spreading code.

FIG. 6 is a conceptual diagram illustrating a frequency axis of a data transmission transmitted by a UE-specific spreading code.

FIG. 6 illustrates a concept of transmitting data of a $k^{th}$ user transmitted by a transmitting end on a frequency axis through a UE-specific spreading code. When a codebook is promised between a transmitting end and a receiving end, data for the $k^{th}$ user is transmitted by multiplying the codeword by the data. In this case, a data symbol $s_k$ corresponds to a codeword vector $c^{(k)}$ of (N×1) dimension. Then, the N number of elements of the codeword corresponds to the N number of subcarriers. In particular, since a data symbol is transmitted through the N number of subcarriers in FIG. 6, efficiency of the same time-frequency resource is reduced to 1/N compared to a legacy LTE system. On the contrary, when symbols equal to or greater than the N number of symbols are transmitted through superposition, time-frequency resource efficiency increases compared to the LTE system. For example, when N<k, if the K number of symbols are transmitted through superposition, a frequency resource efficiency increases as much as K/N times.

Figure 7:
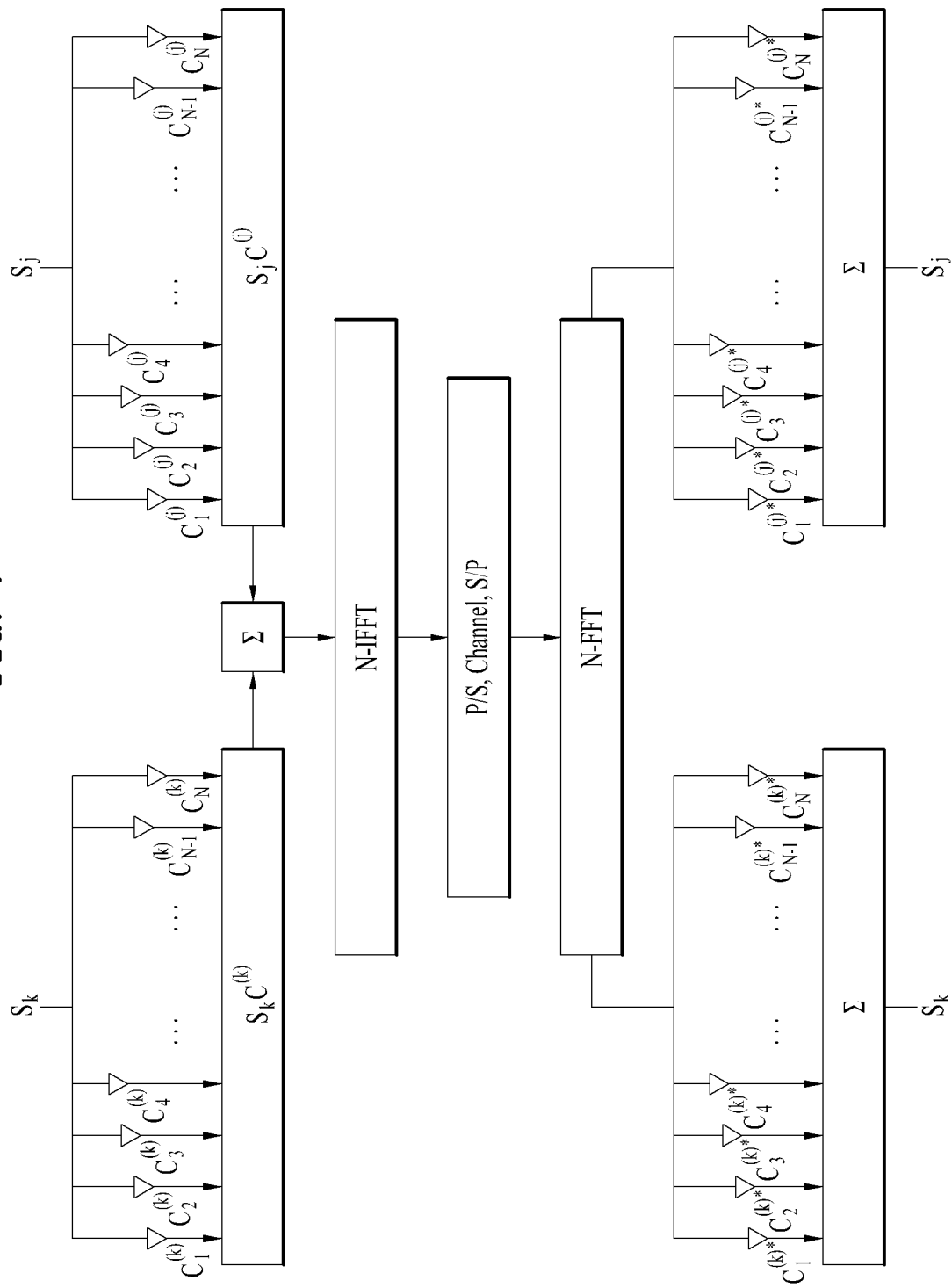
FIG. 7 is a diagram illustrating a basic transmission/reception structure of a non-orthogonal spreading code based NOMA system.

FIG. 7 is a diagram illustrating a basic transmission/reception structure of a non-orthogonal spreading code based NOMA system.

FIG. 7 is a diagram illustrating a basic transmission/reception structure of a NOMA system using a non-orthogonal spreading code. A transmitting end converts a data symbol for a user into a UE-specific spreading code corresponding to the user and the UE-specific spreading code is overlapped. OFDM transmission is performed in a manner that a frequency axis signal having a length of N is converted into a time axis signal through N-IFFT and a receiving end restores the frequency axis signal through N-FFT. The restored frequency axis signal decodes a data symbol of a user using a conjugate codeword of a UE-specific spreading code corresponding to the user. The decoded $s_k$ may include MUI depending on the number of overlapped users. The $s_k$ can be precisely decoded via a MUD scheme or the like. In this case, a length of the converted frequency axis signal can be shorter than N depending on a predefined UE-specific spreading code. For example, when a length of N is formed by connecting two frequency axis signal vectors, which are converted via a UE-specific spreading code of a length of N/2, in series, it is apparent that a receiving end is able to perform demodulation despite of N-FFT.

In downlink, a detection equation for decoding data to be decoded by a receiving end of a $k^{th}$ user can be expressed as equation 5 described in the following.

$$y_k = \sum_{n=1}^{K} H_k c^{(n)} s_n + n_k,$$ [Equation 5]

$$\hat{y}_k = \left[\frac{[y_k]_j}{[H_k]_{j,j}}\right]_{j=1,\ldots,N} = \sum_{n=1}^{K} c^{(n)} s_n + \hat{n}_k,$$

In equation 5, $H_k$ corresponds to (N×N) channel matrix from a $k^{th}$ transmitting end to a receiving end. The channel matrix is a diagonal matrix and includes frequency axis channel coefficients. $c^{(k)}$ corresponds to (N×1) UE-specific spreading code vector from the $k^{th}$ transmitting end to the receiving end. $s_k$ corresponds to a data symbol to a $k^{th}$ receiving end and n corresponds to (N×1) signal noise vector. K corresponds to the number of multiple users allocated to the same time-frequency resource. In this case, $$\left[\frac{[A]_j}{[B]_{j,j}}\right]_{j=1,\ldots,N}$$

denotes the division between $j^{th}$ element of A vector and $j^{th}$ diagonal element of B matrix. When the A vector corresponds to a diagonal matrix, it means element division between diagonal matrixes.

In equation 5, signals of desired codewords and noise are left only via channel compensation. And, as shown in equation 6, detection is performed via a conjugate codeword of a UE-specific spreading code of a receiving end.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k,$$ [Equation 6]

$$= s_k + \sum_{n \neq k, n=1}^{K} c^{(k)*} \cdot c^{(n)} \cdot s_n + \tilde{n}_k.$$

In equation 6, the second term of the last row corresponds to MUI and the MUI can be cancelled or reduced via a MUD scheme.

In uplink, a detection equation for decoding data in a receiving end of a base station can be expressed as equation 7 described in the following.

$$y = \sum_{n=1}^{K} H_n c^{(n)} s_n + n = H_k c^{(k)} s_k + \sum_{n \neq k, n=1}^{K} H_n c^{(n)} s_n + n,$$ [Equation 7]

The second term of the third formula of the equation 7 corresponds to a multi-user interference signal MUI by a data symbol to a different receiving end. A detection equation of a receiving end for decoding data of a $k^{th}$ user can be expressed as equation 8 described in the following.

$$\hat{y}_k = \left[\frac{[y]_j}{[H_k]_{j,j}}\right]_{j=1,\ldots,N} = c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$ [Equation 8]

Signals of desired codewords, MUI, and noise are left only through channel compensation for data of a $k^{th}$ user. And, as shown in equation 9, detection is performed via a conjugate codeword of a UE-specific spreading code of a receiving end.

$$\tilde{y}_k = c^{(k)*} \cdot \hat{y}_k = c^{(k)*} \cdot c^{(k)} s_k + \sum_{n \neq k, n=1}^{K} c^{(k)*} \cdot$$ [Equation 9]

$$\left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In equation 9, the second term of the last row corresponds to MUI and the MUI can be cancelled or reduced via a MUD scheme. In this case, a channel change amount of a frequency axis of $$\left[\frac{[H_n]_{j,j}}{[H_k]_{j,j}}\right]_{j=1,\ldots,N}$$

may bring about a change of reception capability between UE-specific spreading codes due to a channel environment difference from multiple users. In the foregoing description, for clarity, it has been explained as the number of Tx/Rx antennas corresponds to 1. However, it is apparent that the same scheme is also applied to environment using multiple antennas.

Among the aforementioned NOMA techniques, a non-orthogonal codebook based type (e.g., SCMA, CDMA, etc.) transmits a plurality of symbols through superposition using a spreading scheme. There exists a trade-off relationship between interference due to superposition and the increase of a data transfer rate due to the superposition according to a level of superposition between spreading symbols and a configuration of a non-orthogonal codebook. In this case, the interference due to the superposition can be classified into inter-symbol interference (ISI) of a single user and inter-user interference (IUI) and may bring about the decrease of a block error rate (BLER). In particular, it is necessary to perform superposition scheduling and signaling based on required traffic and an interference level. The present invention proposes a method of performing superposition scheduling and signaling based on traffic of a next generation 5G system and interference due to superposition. In particular, the present invention proposes a method of efficiently managing NOMA schemes utilizing a non-orthogonal codebook according to traffic or superposition scheduling.

Embodiment 1: Method of Managing an Orthogonal Subset of a Non-Orthogonal Codebook It is necessary to develop a management scheme for a case that the entire superposition level of a non-orthogonal codebook is not used according to traffic of a single user or multiple users.

A transmitting end and a receiving end assign a UE-specific spreading code to each user using a predefined non-orthogonal codebook. The UE-specific spreading code can be expressed as equation 10 described in the following.

$$C = [\, c^{(1)} \; \cdots \; c^{(K)} \,] = \begin{bmatrix} c_1^{(1)} & \cdots & c_1^{(K)} \\ \vdots & \ddots & \vdots \\ c_N^{(1)} & \cdots & c_N^{(K)} \end{bmatrix} \quad \text{[Equation 10]}$$

In equation 10, N corresponds to a spreading factor, K corresponds to a superposition factor, and there is an overloading factor of K/N. A UE-specific spreading code is defined by a non-orthogonal codebook and includes an orthogonal subset. In this case, non-orthogonality and orthogonality coexist in a single codebook. In this case, it is able to reduce an amount of information, which is exchanged between a transmitting end and a receiving end to promise a codebook.

In particular, a codebook satisfies $C \subset \mathbb{C}^{N \times K}$ and an orthogonal subset OC satisfies $OC \subset C$. Then, the orthogonal subset OC has characteristics described in equation 11 in the following.

$$\begin{cases} |c^{(k)*} \cdot c^{(k)}| = 1, \; \forall k, k = 1, \ldots, O, \\ |c^{(k)*} \cdot c^{(j)}| = 0, \; \forall k, \forall j, k \neq j, k = 1, \ldots, O, j = 1, \ldots, O, \end{cases} \quad \text{[Equation 11]}$$

In equation 11, $c^{(k)*}$ corresponds to a conjugate codeword of $C^{(k)}$.

In equation 11, (1) the multiplication of a codeword same in both a transmitting end and a receiving end corresponds to 1. And, (2) a codeword of its own and a different codeword are orthogonal to each other within an orthogonal subset of the same codebook.

And, a complementary set $OC^c$ of the orthogonal subset satisfies $OC^c \subset C^!$. Then, the complementary set $OC^c$ of the orthogonal subset has characteristics described in the following.

$$\begin{cases} |c^{(k)*} \cdot c^{(k)}| = 1, \; \forall k, k = 1, \ldots, K - 0, \\ |c^{(k)*} \cdot c^{(j)}| = \delta_{kj}, \; \forall k, \forall j, k \neq j, k = 1, \ldots, K - 0, j = 1, \ldots, K - 0, \end{cases} \quad \text{[Equation 12]}$$

In equation 12, (1) the multiplication of a codeword same in both a transmitting end and a receiving end corresponds to 1. And, (2) a codeword of its own and a different codeword are not orthogonal to each other within a complementary set of an orthogonal subset of the same codebook.

In this case, the complementary set $OC^c$ of the orthogonal subset does not always include non-orthogonal characteristic. For example, an orthogonal condition can be established between partial codewords of the complementary set $OC^c$ of the orthogonal subset. And, an orthogonal condition can also be established between a codeword of the $OC^c$ and a codeword of an orthogonal subset OC.

In the aforementioned scheme, it may not use all orthogonal codewords depending on required traffic or a level of interference. For example, when a superposition factor K is not fully used due to a change of a traffic amount or a change of an interference amount according to a change of channel environment, it may be able to adaptively utilize a NOMA or OMA operation in a given resource. By doing so, it may be able to control ISI or IUI by adaptively controlling an overloading factor and select a subset of a codebook within a range satisfying a target BLER.

It is able to define a subset of a codebook based on an overloading factor. When the overloading factor is equal to or less than 1, a transmitting end can select an orthogonal subset. When the overloading factor is greater than 1, the transmitting end can select a non-orthogonal subset. The transmitting end can select a subset of a codebook based on a superposition level.

Figure 8:
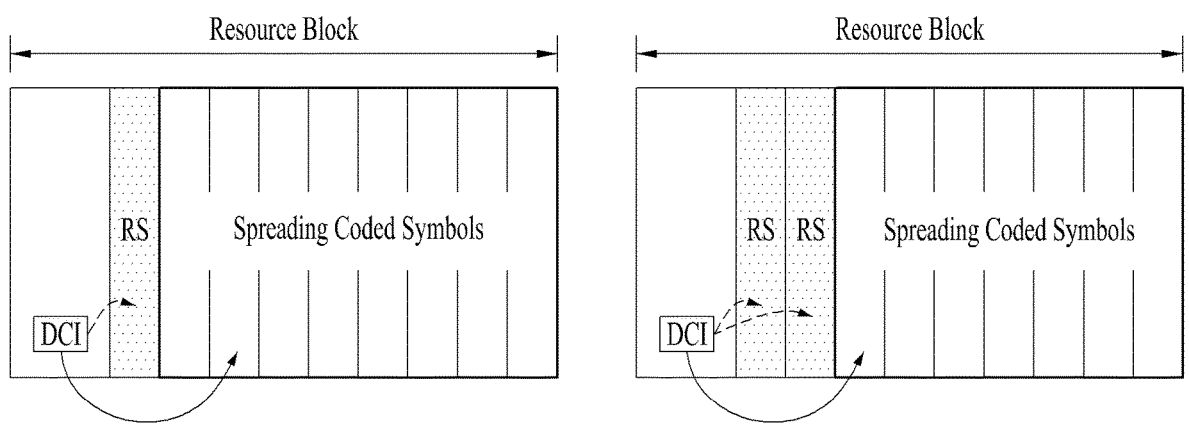
FIG. 8 is a diagram illustrating a change of a reference symbol or a reference signal changed by a codebook subset index.

FIG. 8 is a diagram illustrating a change of a reference symbol or a reference signal changed by a codebook subset index.

As mentioned in the foregoing description, a transmitting end selects a subset of a codebook and can transmit an index of the subset of the codebook as control information (e.g., downlink control information (DCI) format illustrated in FIG. 8). The control information including the codebook subset index information can include codeword allocation information on a single user or multiple users.

When the overloading factor does not exceed 1 by the codebook subset or the number of single user or multiple users is less than N, as shown in the left drawing of FIG. 8, a DCI format can indicate a user equipment to detect a channel corresponding to a codeword based on a reference symbol, a reference signal (RS), or a reference pattern. On the contrary, when the overloading factor exceeds 1 and the number of multiple users is greater than N, as shown in the right drawing of FIG. 8, the DCI format can indicate the user equipment to detect a channel corresponding to a codeword based on multiple RSs or multiple reference patterns. And, the DCI format can explicitly inform the user equipment of the number of symbols of an RS or an RS pattern to be channel estimated by the user equipment to receive a data symbol according to a multi-user superposition access scheme. Or, when the number of symbols of an RS or an RS pattern to be channel estimated by the user equipment is defined in advance according to a codebook subset index, if the user equipment knows the codebook subset index, the user equipment is able to know the number of symbols of the RS or the RS pattern to be channel estimated by the user equipment.

For example, operations described in the following can be performed by selecting a codebook subset.

(1) When a subset index of a subset consisting of A number of codewords is transmitted, and an overloading factor does not exceed 1, if a single user receives a symbol corresponding to all codewords, a receiving end (e.g., user equipment) performs channel detection via an RS and detects a desired symbol via a UE-specific spreading code without a MUD operation.

(2) When a subset index of a subset consisting of B number of codewords is transmitted, and an overloading factor exceeds 1, if a single user receives a symbol corresponding to all codewords, a receiving end performs channel detection via an RS and detects a desired symbol by performing a MUD operation (in case of a single user, interference cancellation (e.g., SIC, PIC, etc.)).

(3) When a subset index of a subset consisting of A number of codewords is transmitted, and an overloading factor does not exceed 1, if C number of users not exceeding N, receive a symbol corresponding to A number of codewords, a receiving end performs channel detection via C number of RSs and detects a desired symbol via a UE-specific spreading code without a MUD operation.

(4) When a subset index of a subset consisting of B number of codewords is transmitted, and an overloading factor exceeds 1, if C number of users not exceeding N, receive a symbol corresponding to all codewords, a receiving end performs channel detection via C number of RSs and detects a desired symbol by performing a MUD operation.

(5) When a subset index of a subset consisting of B number of codewords is transmitted, and an overloading factor exceeds 1, if D number of users exceeding N, receive a symbol corresponding to B number of codewords, a receiving end performs channel detection via D number of RSs and detects a desired symbol via a UE-specific spreading code without a MUD operation.

Since RSs are distinguished from each other using the maximum N number of orthogonal sequences and the C number of RSs does not exceed N, the C number of RSs can be define by a single RS or a reference pattern. For example, since RSs are distinguished from each other using the maximum N number of orthogonal sequences, as shown in the left drawing of FIG. 8, it is able to perform channel estimation by allocating a single RS by overlapping the C number of RSs with an orthogonal sequence. And, since D number of RSs exceeds N, it is unable to define the D number of RSs by a single RS or reference pattern. For example, since RSs are distinguished from each other using the maximum N number of orthogonal sequences, as shown in the right drawing of FIG. 8, it is necessary to allocate an additional RS for (D-N) number of RSs. Or, since the D number of RSs exceeds N, RSs can be distinguished from each other using D number of non-orthogonal sequences. In this case, since it is unable to guarantee orthogonality between RSs, channel estimation performance is deteriorated. In the aforementioned methods, a pattern of an RS, a superposition scheme, an arrangement scheme can be configured in various ways.

In order to operate the aforementioned method, (1) a receiving end (e.g., user equipment) feedbacks a CQI report and/or a buffer state report (BSR) to a transmitting end (e.g., base station) through uplink control information. (2) The base station selects an optimized codebook subset from (1) based on a traffic amount and an interference amount. When the codebook subset is selected, it may or may not consider the uplink control information received from (1). (3) The base station transmits a codebook subset index to the user equipment via control information (e.g., DCI format), configures the number of RSs or an RS pattern based on a selected codebook subset index, and transmits data symbols through superposition based on the codebook subset index. (4) The user equipment performs channel estimation on the RSs or the RS pattern based on the codebook subset index. (5) The user equipment equalizes overlapped data symbols based on an estimated channel and detects a desired symbol by performing interference cancellation or multi-user detection based on the codebook subset index. In this case, if an overloading factor is equal to or less than 1 based on the codebook subset index, a MUD block of the user equipment does not operate and a desired symbol is detected through a UE-specific spreading code only. On the contrary, if the overloading factor is greater than 1 based on the codebook subset index, a desired symbol is detected by operating an MUD block of a receiving end.

Data of a single user can be transmitted through superposition via a single subset by exchanging information between a single user or a single UE and a base station. Data of multiple users can be transmitted through superposition by distributing codewords within a subset via information exchanged between multiple users and a base station.

Although the method above has been explained in the aspect of downlink, the method can be identically applied in the aspect of uplink by transmitting a codebook subset index or a codebook codeword index using a DCI format via scheduling of a base station.

Embodiment 2: Example of Managing an Orthogonal Subset of a Non-Orthogonal Codebook As an example of an orthogonal subset of a non-orthogonal codebook, when a spreading factor N corresponds to 4 and a superposition factor K corresponds to 15, the orthogonal subset of the non-orthogonal codeword is illustrated in Equation 13 in the following.

$$C = [\,c^{(1)}\ \ldots\ c^{(15)}\,] = \begin{bmatrix} c_1^{(1)} & \ldots & c_1^{(15)} \\ \vdots & \ddots & \vdots \\ c_4^{(1)} & \ldots & c_4^{(15)} \end{bmatrix} = \quad \text{[Equation 13]}$$

$$\begin{bmatrix} 1 & 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$$

As illustrated in equations 14 to 18, it is able to distinguish a subset for a codebook based on a change of required traffic or a change of an interference amount according to a channel change.

Subset 1 ($K = 4$): $OC = [\,c^{(12)}\ \ldots\ c^{(15)}\,] =$     [Equation 14]

$$\begin{bmatrix} c_1^{(12)} & \ldots & c_1^{(15)} \\ \vdots & \ddots & \vdots \\ c_4^{(12)} & \ldots & c_4^{(15)} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Subset 2 ($K = 6$): $NC\,1 = [\,c^{(6)}\ c^{(11)}\ \ldots\ c^{(15)}\,] =$     [Equation 15]

$$\begin{bmatrix} c_1^{(6)} & c_1^{(11)} & \ldots & c_1^{(15)} \\ \vdots & \vdots & \ddots & \vdots \\ c_4^{(6)} & c_4^{(11)} & \ldots & c_4^{(15)} \end{bmatrix} = \begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$$

Subset 3 ($K = 8$): $NC\,2 = [\,c^{(6)}\ c^{(7)}\ c^{(10)}\ \ldots\ c^{(15)}\,] =$     [Equation 16]

$$\begin{bmatrix} c_1^{(6)} & c_1^{(7)} & c_1^{(10)} & \ldots & c_1^{(15)} \\ \vdots & \vdots & \vdots & \ddots & \vdots \\ c_4^{(6)} & c_4^{(7)} & c_4^{(10)} & \ldots & c_4^{(15)} \end{bmatrix} =$$

$$\begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$$

Subset 4 ($K = 10$): $NC\,3 = [\,c^{(6)}\ \ldots\ c^{(15)}\,] =$     [Equation 17]

$$\begin{bmatrix} c_1^{(6)} & \ldots & c_1^{(15)} \\ \vdots & \ddots & \vdots \\ c_4^{(6)} & \ldots & c_4^{(15)} \end{bmatrix} = \begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$$

Subset 5 ($K = 14$): $NC\ 4 =$ [Equation 18]

$$[c^{(2)} \ \ldots\ c^{(15)}] = \begin{bmatrix} c_1^{(2)} & \cdots & c_1^{(15)} \\ \vdots & \ddots & \vdots \\ c_4^{(2)} & \cdots & c_4^{(15)} \end{bmatrix} =$$

$$\begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$$

The subset 1 illustrated in equation 14 corresponds to an orthogonal subset of which a spreading factor corresponds to 4 and a superposition factor corresponds to 4. The subset 1 has an overloading factor of 1 and is configured without superposition in the aspect of an element. On the contrary, a subset 2 illustrated in equation 15 has a superposition factor of 6 and an overloading factor of 6/4. The subset 2 has a superposition level of 2 times in the aspect of an element. A subset 3 illustrated in equation 16 has a superposition factor of 8 and an overloading factor of 8/4=2. The subset 3 has a superposition level of 3 times in the aspect of an element. A subset 4 illustrated in equation 17 has a superposition factor of 10 and an overloading factor of 10/4=2.5. The subset 4 has a superposition level of 4 times in the aspect of an element. A subset 5 illustrated in equation 18 has a superposition factor of 14 and an overloading factor of 14/4. The subset 5 has a superposition level of 5 times in the aspect of an element. In case of using the entire codebook of which a superposition factor K corresponds to 15, an overloading factor of the codebook corresponds to 15/4 and the codebook has a superposition level of 6 times in the aspect of an element. An embodiment for the codebook subset is described in the following in a form of 3GPP TS 36.211.

TABLE 1

| Subset Index | Spreading Factor (N) | Superposition Factor (K) | Generalizations | Codewords |
|---|---|---|---|---|
| 0 | 4 | 15 | $[c^{(1)} \ldots c^{(15)}]$ | $\begin{bmatrix} 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$ |
| 1 | 4 | 4 | $[c^{(1)} \ldots c^{(15)}]$ | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 2 | 4 | 6 | $[c^{(6)}\ c^{(11)} \ldots c^{(15)}]$ | $\begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$ |
| 3 | 4 | 8 | $[c^{(6)}\ c^{(7)}\ c^{(10)} \ldots c^{(15)}]$ | $\begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$ |
| 4 | 4 | 10 | $[c^{(6)} \ldots c^{(15)}]$ | $\begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$ |
| 5 | 4 | 14 | $[c^{(2)} \ldots c^{(15)}]$ | $\begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$ |

As traffic required through the subsets is getting higher, a higher overloading factor is used and a channel state is getting worse, a lower superposition factor is used to select a subset. As a superposition level is getting higher, interference cancellation or MUD having better performance is required. It is necessary to select an optimized codebook subset in consideration of the abovementioned characteristics.

For clarity, the examples shown in Table 1 have been explained on the basis of a binary codebook. However, the examples can be identically applied to an orthogonal/non-orthogonal codebook based on a complex coefficient.

In order to perform an operation of NoMA technique, it is necessary to establish a relationship between an RS and a codeword (or sequence) of the NoMA. In particular, it is necessary to define a codeword on which blind detection is to be performed after blind detection is performed on an RS in consideration of contention based MA. And, since a superposition level of the NoMA technique is differently defined according to a technique, it is necessary to establish a relationship between the superposition level of the NoMA and an RS. The present invention defines a relationship between the number of given RSs and a codeword of the NoMA and a data detection procedure.

In the following, the present invention is explained under the assumption of contention based transmission environment. In this case, the contention based transmission assumes a state that downlink synchronization is acquired via initial access, common control information is received, and an RACH procedure and RRC connection are performed (assume that a user equipment (UE) is in an RRC_CONNECTED state). In particular, although the UE has obtained C-RNTI, assume a situation that the UE does not request/receive a UL grant.

In the environment above, it is necessary for a UE to make 5 decisions to perform a contention based data transmission.

1. A physical resource for contention based data transmission
2. A reference signal (RS) for contention based data transmission
3. A transmission scheme for contention based data transmission
4. A data scrambling scheme for contention based data transmission
5. A scheme for a receiving end to detect a UE for contention based data transmission Each of the schemes can be used as a fixed scheme according to system environment or can be randomly determined by a transmitting end. When a scheme is used as a fixed scheme, although it is able to reduce complexity of a detecting/decoding scheme of a receiving end, a base station should transmit common information on the scheme or the information can be fixedly defined in a system. On the other hand, when a transmitting end randomly determines a scheme, although complexity of a detecting/decoding scheme of a receiving end increases, it is able to reduce common information on the scheme transmitted by a base station and a collision for UE data transmission according to a traffic situation. In the following, the 5 schemes are defined and a method of managing the 5 schemes is defined.

1. A Physical Resource for Contention Based Data Transmission

A physical resource for a contention based data transmission can be defined in advance via common control information. In the present invention, assume that a UE performing a contention based transmission is in an RRC_CONNECTED state. Hence, assume that system information is received after downlink synchronization is acquired. A base station broadcasts information on a contention based data transmission zone (can also be referred to as a channel, a region, etc.) to all UEs via common control information. In this case, the contention based data transmission zone may periodically or aperiodically exist. A UE can transmit data through the contention zone existing at the timing closest to the timing at which traffic occurs. The data transmitted by the UE may correspond to single transmission transmitted in a single contention zone or multiple transmissions transmitted in multiple contention zones.

When data is transmitted through a physical resource randomly selected by a UE without a definition on the contention based data transmission zone, the data can be collided with data of a UE, which has received a grant for uplink. In particular, the transmission of the data transmitted through the randomly selected physical resource reduces overall system performance.

The aforementioned physical resource may mean not only a time/frequency resource of a UE but also a time/frequency resource block (e.g., a physical resource block (PRB)). The above scheme corresponds to a definition on the whole of a contention based transmission zone rather than a definition on a plurality of physical resources existing in a single contention based transmission zone.

2. A Reference Signal (RS) for Contention Based Data Transmission

When a UE transmits data in the contention based data transmission zone mentioned earlier in the #1, an RS for estimating a channel is defined. In case of a contention based data transmission, since a grant for transmitting data is not received, it is necessary for a UE to select and transmit an RS. In this case, the RS is selected from the entire set of RSs to estimate a channel on which data of the UE is to be transmitted based on such a scheme as TDM (Time Division Multiplexing)/FDM (Frequency Division Multiplexing)/CDM (Code Division Multiplexing). For example, assume that there are 12 DMRS sequences usable in a single contention based data transmission zone by a cyclic shift (CS) or an orthogonal code cover (OCC) in a system in which a Zadoff-Chu sequence is used as a DMRS (DeModulation RS) (in this case, although a definition on a DMRS defined by a cell ID in an operation in a single cell and a definition on a DMRS for multiple antennas are excluded for clarity, it is able to explain an operation described in the following using the same scheme although a definition on a DMRS for multiple cells and a definition on a DMRS for multiple antennas are considered). Subsequently, the UE randomly selects a DMRS sequence from among the 12 DMRS sequences. In this case, when the UE considers performing transmission on a plurality of layers, the UE can randomly select a plurality of DMRS sequences.

In the scheme above, the UE can select a DMRS sequence in a manner of associating the DMRS sequence with an identifier of the UE (e.g., C-RNTI). For example, when a UE k selects a DMRS, it can be defined as follows. DMRS_INDEX=mod (C-RNTI(k), Maximum DMRS_INDEX) In this case, the C-RNTI(k) corresponds to C-RNTI of the UE k and the Maximum DMRS_INDEX corresponds to the total number of DMRS sequences (in the example above, the total number of DMRS sequences corresponds to 12 and DMRS_INDEX identifies a DMRS sequence). In the scheme above, when the total number of DMRS sequences is greater than the total number of contention resources, it may not use all of the DMRS sequences to perform 1:1 mapping between the DMRS sequences and the contention resources. For example, N corresponds to (Maximum DMRS_INDEX)/(Maximum Codeword_INDEX). In this case, the Maximum Codeword_INDEX is the number of codewords corresponding to the total number of contention resources. Then, selection of a DMRS sequence can be defined as follows: DMRS_INDEX=mod(C-RNTI, Maximum Codeword_INDEX)×N−1

In the definition above, assume that indexes of DMRS sequences are sequentially defined by a CS. In this case, a CS value can be selected in a manner of being associated with the maximum codeword index while the CS value is intermittently used as much as possible. For example, when the maximum codeword index corresponds to 3 and the maximum DMRS index corresponds to 12, DMRS_INDEX corresponds to 3, 7, or 11 when a codeword corresponds to 1, 2, or 3 according to C-RNTI.

3. A Transmission Scheme for Contention Based Data Transmission

When a UE transmits data based on a DMRS to which the DMRS sequence, which is selected in the #2 (the RS for performing contention based data transmission), is applied within the contention based data transmission zone defined in the #1 (the physical resource for performing the contention based data transmission) (i.e., when the UE transmits a data channel including the DMRS to which the selected DMRS sequence is applied), a data transmission scheme is defined. In this case, the data transmission scheme includes a method of selecting a plurality of contention resources in the contention based data transmission zone. In this case, the contention resources can include various resources such as time, frequency, codeword (or sequence), power, scrambling, interleaver, spatial resource, and the like. In the following description, for clarity, a codeword is explained as a representative example among the contention resources. It is apparent that the present invention is identically applied to other contention resources including time, frequency, power, scrambling, interleaver, and spatial resource. The present invention can also be identically applied to a case that the contention resources coexist.

In case of a contention based data transmission, since a UE does not receive a grant for transmitting data, it is necessary for the UE to select a resource for transmitting data from among contention resources and transmit data through the selected resource. For example, assume that there are 12 codeword resources in a state that a time resource, a frequency resource, and the like coexist within a contention zone. In this case, a UE randomly selects a codeword from among the 12 codeword resources and can perform data transmission based on the selected codeword resource. In this case, each UE transmits data using a different codeword in the same physical resource of the same codeword zone and makes a receiving end (e.g., base station) detect and decode the data transmitted by a different codeword.

In the scheme above, a UE can select (selection of a codeword in the above example) a contention resource by associating the contention resource with C-RNTI of the UE. For example, when a UE k selects a codeword, it can be defined as follows: Codeword_INDEX=mod(C-RNTI(k), Maximum Codeword_INDEX) In this case, C-RNTI(k) corresponds to C-RNTI of the UE k and the Maximum Codeword_INDEX is the number of codewords corresponding to the total number of contention resources (in the example above, the total number of codewords is 12). In the scheme above, when a codeword set is defined by a cell ID, the abovementioned operation is performed within a set corresponding to a single cell.

In the scheme above, a UE can select a contention resource (selection of a codeword in the above example) by associating the contention resource with a DMRS sequence of the UE. For example, the codeword selected by the UE k can be defined as follows:

Case 1: Maximum DMRS_INDEX<Maximum Codeword_INDEX

The case 1 corresponds to a case that the total number of DMRSs is less than the total number of contention resources (in the example above, the total number of codewords). In this case, 1:M mapping can be performed between the DMRS sequences and the contention resources. For example, selection of a codeword satisfies a relationship described in the following. It can be defined as DMRS_INDEX=⌈Codeword_INDEX/M⌉ (=ceil(Codeword_INDEX/M)). In this case, M corresponds to (Maximum Codeword_INDEX)/(Maximum DMRS_INDEX). For example, when the maximum codeword index corresponds to 12 and the maximum DMRS index corresponds to 4, Codeword_INDEX corresponds to 1, 2, or 3 when a DMRS_INDEX corresponds to 1 and Codeword_INDEX corresponds to 4, 5, or 6 when a DMRS_INDEX corresponds to 2. In this case, although a collision does not occur on a DMRS sequence by multiple users, a collision may occur between codewords. However, when a UE performs decoding on data through blind detection of a DMRS, the UE can perform the data decoding by reducing the number of blind decoding to M based on a mapped codeword.

When a DMRS sequence and a contention resource are not mapped, it is necessary to additionally perform blind detection on a codeword to decode data after blind detection is performed on a DMRS. And, although a collision does not occur between DMRS sequences, a collision may occur between codewords. In this case, although a channel is normally estimated, it may fail to guarantee performance of MUD in a receiving end due to the collision between codewords. Or, although a collision occurs between DMRS sequences, a collision may not occur between codewords. In this case, although MUD is feasible by using a different codeword, since channel estimation is not normally performed, it is difficult to guarantee MUD performance.

In addition, since a DMRS collision probability and a codeword collision probability independently work, an overall collision probability may increase. For example, when a DMRS sequence and a contention resource are mapped, a probability of not having a collision in both a DMRS and a codeword is 2/3 in a contention based transmission of two UEs. On the contrary, when a DMRS sequence and a contention resource are not mapped, a probability of not having a collision in both a DMRS and a codeword is 22/36. In particular, when a collision does not occur in at least one of a DMRS and a codeword, it is advantageous to perform mapping between a DMRS sequence and a contention resource in terms of a collision probability in environment in which decoding performance enabling MUD is not guaranteed.

On the contrary, when a collision does not occur in at least one of a DMRS and a codeword, it may not assume mapping between a DMRS sequence and a contention resource in environment in which decoding performance enabling MUD is guaranteed (i.e., environment in which MUD performance is guaranteed). For example, when a DMRS sequence and a contention resource are mapped, a probability of having a collision in both a DMRS and a codeword is 1/3 in a contention based transmission of two UEs. On the contrary, when a DMRS sequence and a contention resource are not mapped, a probability of having a collision in both a DMRS and a codeword is 1/36. In particular, in environment in which MUD performance is guaranteed and blind detection complexity of a receiving end is accepted, a DMRS sequence and a contention resource are not mapped and it may randomly select a codeword index.

However, in the case 1, it is difficult to guarantee MUD performance of a receiving end in general. When 1:M mapping is performed, although two or more users select a different codeword, it may be necessary for the users to use the same DMRS. In this case, since the two or more users (or UEs) share the same DMRS, it is difficult for a base station corresponding to a receiving end to normally estimate channels of the two users. As a result, channel estimation performance is decreased. The decrease of the channel estimation performance considerably decreases MUD performance via NOMA.

FIG. 9 is a diagram illustrating BLER performance when perfect channel estimation is performed and realistic channel estimation is performed, although two or more users use a different DMRS.

FIG. 9 (a) illustrates BLER performance when perfect channel estimation is performed and FIG. 9 (b) illustrates BLER performance when realistic channel estimation is performed.

FIG. 9 illustrates BLER performance when PIC is adopted for MUD and NCMA corresponding to one of NoMA techniques transmits 144 bits using turbo coding 1/4 via 4 PRBs in TDL-C 3 km/h environment. In case of the perfect channel estimation shown in FIG. 9 (a), when the number of users increases up to 5, a loss compared to BLER performance seldom exist for two users of OFDMA corresponding to a reference system. On the contrary, in case of the realistic channel estimation shown in FIG. 9 (b), when the number of users increases, it may cause a loss of BLER performance compared to the reference system. If the same DMRS is used, it is apparent that the performance loss is to be considerably increased. In particular, the environment of the case 1 may correspond to undesirable contention based NoMA environment. Hence, it may be preferable to manage a system using methods of Case 2 and Case 3 described in the following.

Case 2: Maximum DMRS_INDEX=Maximum Codeword_INDEX

Figure 10:
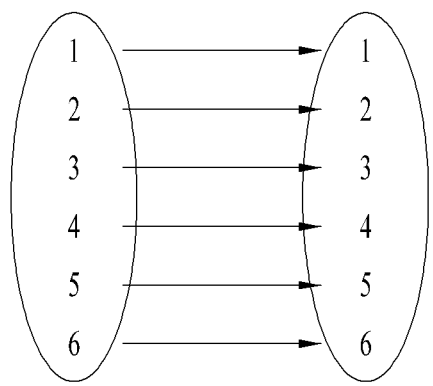
FIG. 10 illustrates an example of 1:1 mapping relationship between 6 DMRS indexes and 6 codeword indexes.
Figure 11:
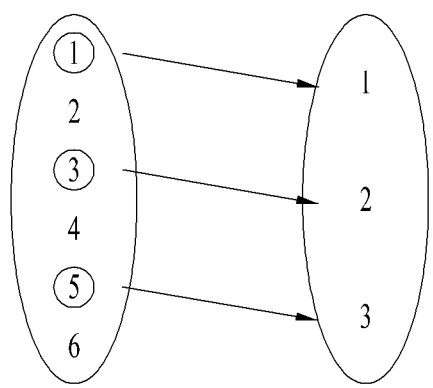
FIG. 11 illustrates an example of 1:1 mapping relationship between 6 DMRS indexes and 3 codeword indexes.

The case 2 corresponds to a case that the total number of DMRSs is identical to the total number of contention resources (in the example above, the total number of codewords). In this case, 1:1 mapping can be performed between DMRS sequences and contention resources. Codeword_INDEX=DMRS_INDEX. For example, when the maximum number of codewords corresponds to 12 and the maximum number of DMRSs corresponds to 12, DMRS_INDEX corresponds to 1 when a codeword corresponds to 1 according to C-RNTI. In this case, when a collision does not occur on a DMRS sequence by multiple users, a collision does not occur between codewords. When a UE performs decoding on data through blind detection of a DMRS, the UE can perform the data decoding based on a mapped codeword without blind detection. FIG. 10 illustrates an example of 1:1 mapping relationship between 6 DMRS indexes and 6 codeword indexes.

When a DMRS sequence and a contention resource are not mapped, it is necessary to additionally perform blind detection on a codeword to decode data after blind detection is performed on a DMRS. And, although a collision does not occur between DMRS sequences, a collision may occur between codewords. In this case, although a channel is normally estimated, it may fail to guarantee performance of MUD in a receiving end due to the collision between codewords. Or, although a collision occurs between DMRS sequences, a collision may not occur between codewords. In this case, although MUD is feasible by using a different codeword, since channel estimation is not normally performed, it is difficult to guarantee MUD performance.

In addition, since a DMRS collision probability and a codeword collision probability independently work, an overall collision probability may increase. For example, when a DMRS sequence and a contention resource are mapped, a probability of not having a collision in both a DMRS and a codeword is 11/12 in a contention based transmission of two UEs. On the contrary, when a DMRS sequence and a contention resource are not mapped, a probability of not having a collision in both a DMRS and a codeword is 121/144. In particular, when a collision does not occur in at least one of a DMRS and a codeword, it is advantageous to perform mapping between a DMRS sequence and a contention resource in terms of a collision probability in environment in which decoding performance enabling MUD is not guaranteed.

On the contrary, when a collision does not occur in at least one of a DMRS and a codeword, it may not assume mapping between a DMRS sequence and a contention resource in environment in which decoding performance enabling MUD is guaranteed (i.e., environment in which MUD performance is guaranteed). For example, when a DMRS sequence and a contention resource are mapped, a probability of having a collision in both a DMRS and a codeword is 1/12 in a contention based transmission of two UEs. On the contrary, when a DMRS sequence and a contention resource are not mapped, a probability of having a collision in both a DMRS and a codeword is 1/144. In particular, in environment in which MUD performance is guaranteed and blind detection complexity of a receiving end is accepted, a DMRS sequence and a contention resource are not mapped and it may randomly select a codeword index.

Case 3: Maximum DMRS_INDEX>Maximum Codeword_INDEX

The case 3 corresponds to a case that the total number of DMRSs is greater the total number of contention resources (in the example above, the total number of codewords). In this case, N:1 or 1:1 mapping can be performed between DMRS sequences and contention resources. For example, in case of the 1:1 mapping, in order to perform the 1:1 mapping between DMRS sequences and contention resources, it may not use all DMRS sequences. Assume that N corresponds to (Maximum DMRS_INDEX)/(Maximum Codeword_INDEX). Then, selection of a codeword is defined as Codeword_INDEX=mod(C-RNTI, Maximum Codeword_INDEX) and selection of a DMRS sequence can be defined as DMRS_INDEX=mod(C-RNTI, Maximum Codeword_INDEX)×N−1. In the definition above, assume that indexes of DMRS sequences are sequentially defined by a CS. In this case, a CS value can be selected in a manner of being associated with the maximum codeword index while the CS value is intermittently used as much as possible. For example, when the maximum codeword index corresponds to 3 and the maximum DMRS index corresponds to 12, DMRS_INDEX corresponds to 3, 7, or 11 when a codeword corresponds to 1, 2, or 3 according to C-RNTI. In this case, when a collision does not occur on a DMRS sequence by multiple users, a collision does not occur between codewords. When a UE performs decoding on data through blind detection of a DMRS, the UE can perform the data decoding based on a mapped codeword without blind detection. FIG.

11 illustrates an example of 1:1 mapping relationship between 6 DMRS indexes and 3 codeword indexes.

Figure 12:
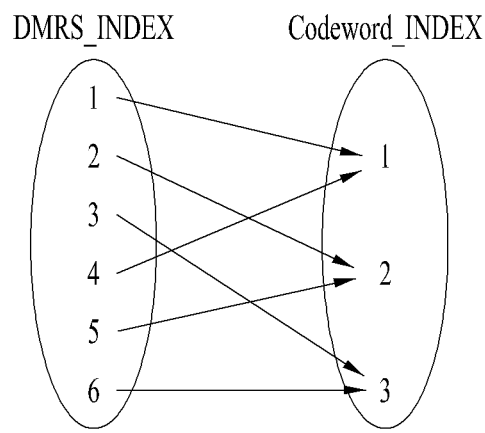
FIG. 12 illustrates an example of 2:1 mapping relationship between 6 DMRS indexes and 3 codeword indexes.

For example, in case of the N:1 mapping, in order to perform the N:1 mapping between DMRS sequences and contention resources, N number of DMRS sequences are mapped to 1 codeword. Then, selection of a codeword is defined as Codeword_INDEX=mod(DMRS_INDEX, Maximum Codeword_INDEX). For example, when the maximum codeword index corresponds to 3 and the maximum DMRS index corresponds to 12, codeword_INDEX corresponds to 1 when a DMRS_INDEX corresponds to 1, 4, 7, or 10 and codeword_INDEX corresponds to 2 when a DMRS_INDEX corresponds to 2, 5, 8, or 11. In this case, when a UE performs decoding on data through blind detection of a DMRS, the UE can perform the data decoding based on a mapped codeword without blind detection. And, when a collision does not occur on a DMRS sequence by multiple users, although a collision occurs between codewords, it is able to perform MUD by increasing channel estimation performance by reducing a collision probability between DMRSs (if the channel estimation performance is guaranteed, it is able to perform MUD using a combining technique (e.g., MRC-IC or MMSE-IRC) via MIMO or an SCI scheme via a power difference). FIG. 12 illustrates an example of 2:1 mapping relationship between 6 DMRS indexes and 3 codeword indexes.

When a DMRS sequence and a contention resource are not mapped, it is necessary to additionally perform blind detection on a codeword to decode data after blind detection is performed on a DMRS. And, although a collision does not occur between DMRS sequences, a collision may occur between codewords. In this case, although a channel is normally estimated, it may fail to guarantee performance of MUD in a receiving end due to the collision between codewords. Or, although a collision occurs between DMRS sequences, a collision may not occur between codewords. In this case, although MUD is feasible by using a different codeword, since channel estimation is not normally performed, it is difficult to guarantee MUD performance.

In addition, since a DMRS collision probability and a codeword collision probability independently work, an overall collision probability may increase. For example, when a DMRS sequence and a contention resource are mapped, a probability of not having a collision in both a DMRS and a codeword is 2/3 in a contention based transmission of two UEs. On the contrary, when a DMRS sequence and a contention resource are not mapped, a probability of not having a collision in both a DMRS and a codeword is 22/36. In particular, when a collision does not occur in at least one of a DMRS and a codeword, it is advantageous to perform mapping between a DMRS sequence and a contention resource in terms of a collision probability in environment in which decoding performance enabling MUD is not guaranteed.

On the contrary, when a collision does not occur in at least one of a DMRS and a codeword, it may not assume mapping between a DMRS sequence and a contention resource in environment in which decoding performance enabling MUD is guaranteed (i.e., environment in which MUD performance is guaranteed). For example, when a DMRS sequence and a contention resource are mapped, a probability of having a collision in both a DMRS and a codeword is 1/3 in a contention based transmission of two UEs. On the contrary, when a DMRS sequence and a contention resource are not mapped, a probability of having a collision in both a DMRS and a codeword is 1/36. In particular, in environment in which MUD performance is guaranteed and blind detection complexity of a receiving end is accepted, a DMRS sequence and a contention resource are not mapped and it may randomly select a codeword index.

4. A Data Scrambling Scheme for Contention Based Data Transmission

In a contention based data transmission, since data is not transmitted based on a grant, a receiving end (e.g., base station) decodes data of a UE in a state of not knowing C-RNTI. Hence, it is difficult to apply UE-specific scrambling to data transmission. When the UE-specific scrambling is applied, it is necessary to perform blind detection on the entire scrambling. As a result, blind detection of the receiving end causes huge complexity. Hence, when a UE transmits data in the contention based data transmission zone mentioned earlier in the #1 based on the DMRS defined in the #2 and the contention resource defined in the #3, it is necessary to define scrambling for the transmitted data.

4.1 A scrambling sequence can be generated by performing 1:1 mapping in a manner of being associated with a DMRS index or a codeword index.

When a UE transmits data in the contention based data transmission zone mentioned earlier in the #1 based on the DMRS defined in the #2 and the contention resource defined in the #3, a scrambling sequence for the transmitted data can be generated by performing 1:1 mapping in a manner of being associated with a DMRS index or a codeword index. The operation above can be applied by a scheme identical to the scheme of the case 1 of the #3 and an effect is the same as well.

4.2 A scrambling sequence can be generated by performing 1:L mapping in a manner of being associated with a DMRS index or a codeword index.

When a UE transmits data in the contention based data transmission zone mentioned earlier in the #1 based on the DMRS defined in the #2 and the contention resource defined in the #3, a scrambling sequence for the transmitted data can be generated by performing 1:L mapping in a manner of being associated with a DMRS index or a codeword index. In this case, the L can be defined to be greater than 1 to reduce a collision probability according to system environment. In this case, it is necessary for a receiving end (e.g., base station) to perform L number of blind detections on the scrambling sequence. The operation above can be applied by a scheme identical to the scheme of the case 1 of the #3 and an effect is the same as well.

When a UE selects a scrambling sequence, the UE can select the scrambling sequence by associating the scrambling sequence with a cell ID and a DMRS. A base sequence is generated based on a cell ID and the base sequence is generated in a manner of being tied with a DMRS specific scrambling sequence based on a DMRS index. For example, when 1:1 mapping is performed with a DMRS, it can be expressed as FIG. 13 in the following.

Figure 13:
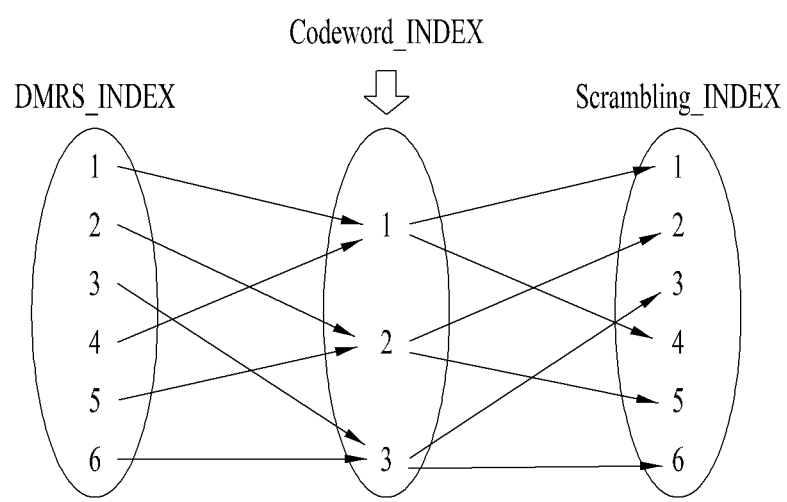
FIG. 13 is a diagram illustrating a mapping relationship among a scrambling sequence, a codeword index, and a DMRS index.

FIG. 13 is a diagram illustrating a mapping relationship among a scrambling sequence, a codeword index, and a DMRS index.

When a scrambling sequence is mapped using a scheme illustrated in FIG. 13, since the number of codewords is less, multiple users may use the same codeword, thereby degrading MUD performance. In this case, it is able to enhance the MUD performance using scrambling.

FIG. 14 is a diagram illustrating a mapping relationship among a scrambling sequence, a codeword index, and a DMRS index. As illustrated in FIG. 14, 1:1 mapping can be performed on a DMRS, a codeword, and scrambling. The mapping relationships illustrated in FIGS. 13 and 14 can be shared between a UE and a base station in a manner of being defined in advance.

5. A Scheme for a Receiving End (e.g., Base Station) to Detect a UE for Contention Based Data Transmission In a contention based data transmission, since data is not transmitted based on a grant, a receiving end decodes data of a UE in a state of not knowing C-RNTI. Hence, it is difficult to know a UE from which the data is transmitted. Hence, it is able to transmit C-RNTI by designating a partial field of a data zone.

Figure 15:
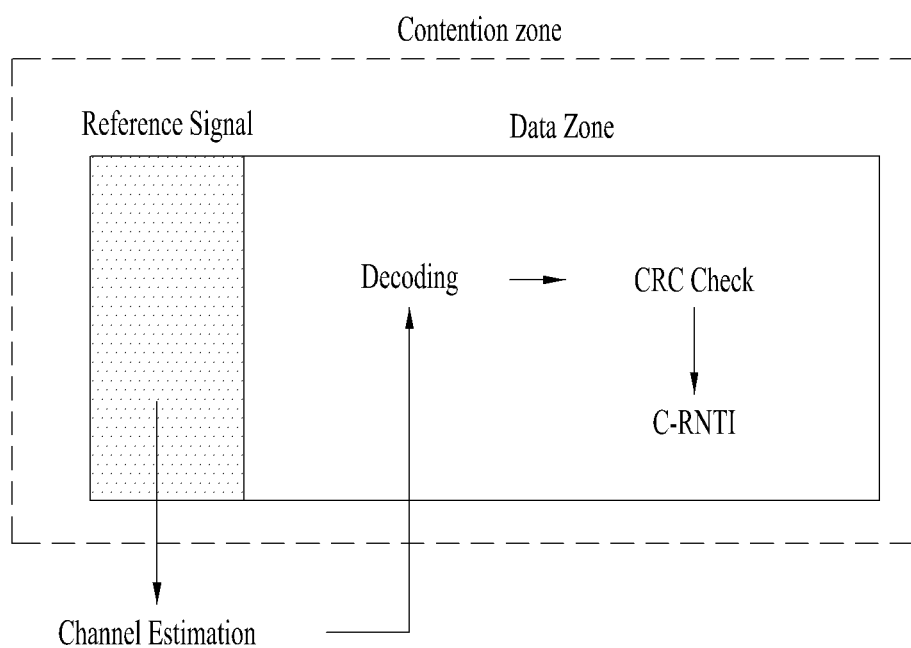
FIG. 15 is a diagram illustrating a method for a receiving end to identify a user equipment from which data is transmitted in a contention zone.

FIG. 15 is a diagram illustrating a method for a receiving end to identify a user equipment from which data is transmitted in a contention zone.

The receiving end receives the RS mentioned earlier in the #2 via the contention zone mentioned earlier in the #1 and performs channel estimation based on the RS. The receiving end decodes data of a data zone according to the transmission scheme mentioned earlier in the #3 and determines whether or not there is an error in the data via CRC check. When the CRC check is passed, the receiving end obtains information on C-RNTI included in a field predefined in the data zone. The receiving end is able to know a UE from which the data is transmitted based on the obtained C-RNTI.

Although the scheme above explains a contention based transmission, the scheme can also be applied to a scheduling based transmission. For example, in case of the #2, a DMRS of a UE can be selected by modulo arithmetic with C-RNTI. Then, it is able to omit transmission of grant information on the DMRS, thereby reducing overhead for a grant. In this case, it is necessary for a base station to perform scheduling in consideration of a DMRS selected by a UE. Similarly, in case of the #3 or #4, a codeword or a scrambling sequence of a UE can be selected by modulo arithmetic with C-RNTI. Then, it is able to omit transmission of grant information on the codeword or the scrambling sequence, thereby reducing overhead for a grant. In this case, it is necessary for a base station to perform scheduling in consideration of a codeword or a scrambling selected by a UE.

Figure 16:
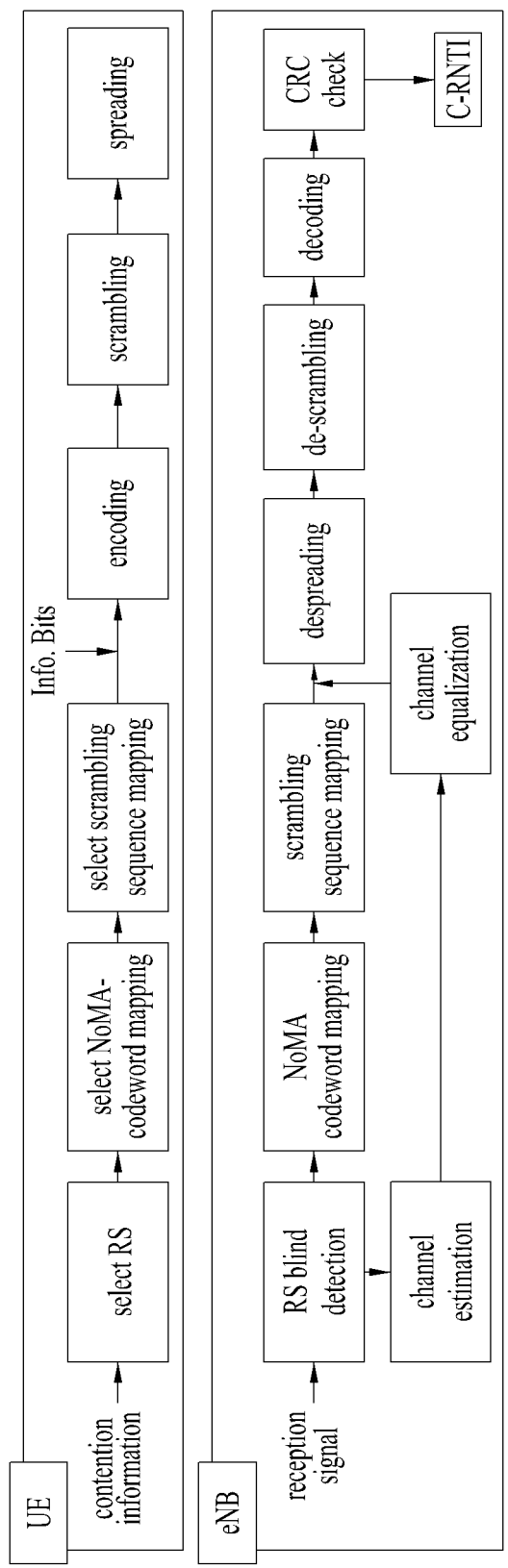
FIG. 16 illustrates the entire procedure that summarizes contents of the present invention.

FIG. 16 illustrates the entire procedure that summarizes contents of the present invention.

1. A UE recognizes a physical resource region in which contention based MA operates, an MCS level, power control, and the like via a predefined or broadcast step and an RRC connection step.

2. When traffic occurs, the UE prepares for uplink transmission based on contention information (e.g., information on the physical resource region in which contention based MA operates, the MCS level, and power control) (a physical resource for performing the contention based data transmission mentioned earlier in the #1). The UE prepares for uplink transmission in a physical resource (a predefined resource or a resource selected by the UE) in which contention based MA operates).

3. The UE selects an RS (e.g., a specific DMRS sequence) for performing data transmission from a physical resource region in which contention based MA operates and transmits data based on the selected RS (the RS for performing contention based data transmission mentioned earlier in the #2). In this case, the UE can randomly select the RS. The RS can be selected based on UE-specific or group-specific information. For example, the UE can select the RS based on C-RNTI.

4. The UE determines NoMA-codeword in the physical resource region in which the contention based MA operates (3. A transmission scheme for performing contention based data transmission). The UE can randomly select the NoMA-codeword. The UE can determine the NoMA-codeword based on a mapping relationship between the selected RS and the NoMA-codeword. In this case, the mapping relationship between the RS and the NoMA-codeword may correspond to 1:1, N:1, or 1:N.

5. The UE determines a scrambling sequence in the physical resource region in which the contention based MA operates. The UE can randomly select the scrambling sequence. The UE can select a scrambling sequence mapped to the selected RS. In this case, the mapping relationship between the RS and the scrambling sequence may correspond to 1:1, N:1, or 1:N.

The UE may select a scrambling sequence based on a mapping relationship between the selected NoMA-codeword and the scrambling sequence. In this case, the mapping relationship between the NoMA-codeword and the scrambling sequence may correspond to 1:1, N:1, or 1:N.

6. The UE encodes, scrambles, modulates and spreads the generated traffic (information bits stream) based on the selected or determined information and can transmit uplink data in the physical resource region in which the contention based MA operates. In the operation above, an order of the scrambling, the modulating, and the spreading may change depending on a NoMA technique. In the operation above, the UE may transmit uplink data by deleting or omitting a part of the scrambling, the modulating, and the spreading depending on a NoMA technique.

7. A base station and the UE share the physical resource region in which the contention based MA operates, the MCS level, the power control, etc. through the predefined or broadcast step and the RRC connection step. In the operation above, the base station may perform blind detection in a state that the base station does not know a part of the information.

8. The base station performs blind detection on an RS in the physical resource region in which the contention based MA operates. When the RS is detected, the base station performs channel estimation based on the detected RS and stores an RS index.

9. The base station prepares for data decoding according to a determination rule of a NoMA-codeword and a scrambling sequence which are determined in advance or promised with the UE in advance. When there is a mapping rule with an RS, the base station determines the NoMA-codeword and the scrambling sequence based on an RS index. However, when there is no mapping rule (relationship) with an RS, the base station performs blind detection on the NoMA-codeword.

When there is a mapping rule with a NoMA-codeword, the base station determines a scrambling sequence based on a NoMA-codeword index. However, when there is no mapping rule with a NoMA-codeword, the base station performs blind detection on a scrambling sequence.

10. The base station performs channel equalization in the physical resource region in which the contention based MA operates based on channel estimation information which is obtained by performing the channel estimation.

11. The base station performs de-spreading, de-modulating, de-scrambling, and decoding based on the obtained NoMA-codeword and the scrambling sequence. In the operation above, an order of the de-spreading, the de-modulating, and the de-scrambling may change depending on a NoMA technique. In the operation above, the base station may delete or omit a part of the de-spreading, the de-modulating, and the de-scrambling depending on a NoMA technique.

12. The base station performs CRC check on a decoded data and determines whether or not the information is precisely decoded.

13. If it is determined that data transmitted by the UE is precisely decoded, the base station extracts C-RNTI information from the data and forwards the information to a higher layer.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting/detecting data based on a non-orthogonal multiple access scheme and an apparatus therefor can be industrially applied to various wireless communication systems including 3GPP LTE-A, 5G system, and the like.

What is claimed is:

1. A method for a user equipment (UE) transmitting data based on a non-orthogonal multiple access scheme, comprising the steps of:
   randomly selecting a physical resource for performing non-orthogonal multiple access from a predefined contention based data transmission resource region;
   selecting a reference signal sequence for performing contention based data transmission through the selected physical resource;
   selecting a contention resource for performing the contention based data transmission;
   selecting a scrambling sequence to be applied to a data transmission in the contention based data transmission; and
   transmitting a data channel containing data and a reference signal corresponding to the selected reference signal sequence through the selected physical resource,
   wherein the data channel is transmitted by applying the selected scrambling sequence.

2. The method of claim 1, wherein the selected reference signal sequence is selected based on an identifier of the UE.

3. The method of claim 1, wherein the selected contention resource contains a selected codeword.

4. The method of claim 3, wherein the selected codeword is selected based on the selected reference signal sequence according to a predefined rule.

5. The method of claim 4, wherein the selected scrambling sequence is selected based on the selected codeword according to the predefined rule.

6. The method of claim 1, further comprising the step of receiving information on the predefined contention based data transmission resource region from a base station.

7. A method for a base station (BS) detecting data according to an orthogonal multiple access scheme, comprising the steps of:
   receiving a reference signal and data in a predefined contention based data transmission resource region;
   detecting the reference signal and the data from the predefined contention based data transmission resource region;
   detecting a codeword corresponding to the detected data and a scrambling sequence applied to the detected data from a reference signal sequence corresponding to the detected reference signal based on a predefined rule; and
   decoding the data based on the reference signal sequence, the codeword, and the scrambling sequence.

8. The method of claim 7, further comprising the step of identifying a user equipment from which the data is transmitted based on the reference signal sequence, the codeword, and the scrambling sequence according to the predefined rule.

9. The method of claim 7, further comprising the steps of:
   performing channel estimation using the detected reference signal; and
   performing channel equalization in the predefined contention based data transmission resource region based on the channel estimation.

10. A user equipment (UE) transmitting data based on an orthogonal multiple access scheme, comprising:
    a processor configured to randomly select a physical resource for performing non-orthogonal multiple access from a predefined contention based data transmission resource region, the processor configured to select a reference signal sequence for performing contention based data transmission through the selected physical resource, the processor configured to select a contention resource for performing the contention based data transmission, the processor configured to select a scrambling sequence to be applied to a data transmission in the contention based data transmission; and
    a transmitter configured to transmit a data channel containing data and a reference signal corresponding to the selected reference signal sequence through the selected physical resource,
    wherein the processor is configured to apply the selected scrambling sequence to the data channel.

11. The UE of claim 10, wherein the processor is configured to select the reference signal sequence based on an identifier of the UE.

12. The UE of claim 10, wherein the selected contention resource contains a selected codeword.

13. The UE of claim 12, wherein the processor is configured to select the codeword based on the selected reference signal sequence according to a predefined rule.

14. The UE of claim 13, wherein the processor is configured to select the selected scrambling sequence based on the selected codeword according to the predefined rule.

15. A base station detecting data according to an orthogonal multiple access scheme, comprising:
- a receiver configured to receive a reference signal and data in a predefined contention based data transmission resource region; and
- a processor configured to detect the reference signal and the data from the predefined contention based data transmission resource region, the processor configured to detect a codeword corresponding to the detected data and a scrambling sequence applied to the detected data from a reference signal sequence corresponding to the detected reference signal based on a predefined rule, the processor configured to decode the data based on the reference signal sequence, the codeword, and the scrambling sequence.

* * * * *